(12) United States Patent
Czazasty et al.

(10) Patent No.: US 11,499,901 B2
(45) Date of Patent: Nov. 15, 2022

(54) CORRECTING FOR GRAVITATIONAL FORCE VARIATION IN MEASURING THE MELT FLOW INDEX OF A POLYMER

(71) Applicant: Dynisco Instruments LLC, Franklin, MA (US)

(72) Inventors: John A. Czazasty, Norton, MA (US); Michael P. Leonardi, Mansfield, MA (US)

(73) Assignee: Dynisco Instruments LLC, Franklin, MA (US)

( * ) Notice: Subject to any disclaimer, the term of this patent is extended or adjusted under 35 U.S.C. 154(b) by 81 days.

(21) Appl. No.: 16/643,036

(22) PCT Filed: Aug. 2, 2018

(86) PCT No.: PCT/US2018/044940
§ 371 (c)(1),
(2) Date: Feb. 28, 2020

(87) PCT Pub. No.: WO2019/045946
PCT Pub. Date: Mar. 7, 2019

(65) Prior Publication Data
US 2020/0209129 A1 Jul. 2, 2020

Related U.S. Application Data

(60) Provisional application No. 62/552,583, filed on Aug. 31, 2017.

(51) Int. Cl.
*G01N 11/02* (2006.01)
*G01N 11/00* (2006.01)

(52) U.S. Cl.
CPC ...... *G01N 11/02* (2013.01); *G01N 2011/0006* (2013.01)

(58) Field of Classification Search
CPC .......... G01N 11/02; G01N 2011/0006; G01N 11/04; G01N 11/06
(Continued)

(56) References Cited

U.S. PATENT DOCUMENTS

| 2,645,931 A | 7/1953 | Johnson |
| 6,786,074 B1 | 9/2004 | Campuzano |

(Continued)

FOREIGN PATENT DOCUMENTS

| CN | 101634586 | 1/2010 |
| CN | 102203583 | 9/2011 |

(Continued)

OTHER PUBLICATIONS

"Standard test method for melt flow rates of thermoplastics by extrusion plastometer," ASTM Design, ASTM International, 2001, D1238:1-12.

(Continued)

*Primary Examiner* — Robert R Raevis
(74) *Attorney, Agent, or Firm* — Fish & Richardson P.C.

(57) ABSTRACT

Methods and apparatus are disclosed for correcting for gravitational force variation in measuring the melt flow index of a polymer at a location. For example, ample, some embodiments may involve determining a value representing an extent to which gravitational force at the location varies from standard gravity, such as based at least in part upon the latitude of the location. The value may be used in correcting the melt flow index measured for the polymer using a plastometer at the location.

19 Claims, 4 Drawing Sheets

(58) Field of Classification Search
USPC ... 73/54.01, 1.01, 1.03, 54.07, 54.08, 54.13, 73/866
See application file for complete search history.

(56) References Cited

U.S. PATENT DOCUMENTS

| | | |
|---|---|---|
| 2004/0122609 A1 | 6/2004 | Yoshizawa |
| 2011/0264386 A1 | 10/2011 | Kasten |
| 2016/0091404 A1 | 3/2016 | Flock et al. |

FOREIGN PATENT DOCUMENTS

| | | | |
|---|---|---|---|
| CN | 102323147 | | 1/2012 |
| CN | 204389339 | | 6/2015 |
| CN | 105222877 | | 1/2016 |
| CN | 105588786 | | 5/2016 |
| CN | 106441297 | | 2/2017 |
| CN | 106443827 | | 2/2017 |
| CN | 106706106 | | 5/2017 |
| CN | 106769677 | * | 5/2017 |
| CN | 107036575 | | 8/2017 |

OTHER PUBLICATIONS

International Preliminary Report on Patentability in International Appln. No. PCT/US2018/044940, dated Mar. 3, 2020, 9 pages.
International Search Report and Written Opinion in International Appln. No. PCT/US2018/044940, dated Oct. 10, 2018, 11 pages.
Jianghai et al., "Determination of the melt mass-flow rate (MFR) and the melt volume-flow rate (MVR) of thermoplastics," GB/T 3682-2000, National Standard Of The People's Republic of China, Oct. 27, 2000, 19 pages.
Xiaoyan et al., "Gravity Obervation Technique," Textbooks Planned for Earthquake Major in General Higher Education, Seismological Press, May 1977, pp. 18-19 (with English Translation), 10 pages.

* cited by examiner

FIG. 1 - Prior Art

CORRECTING FOR GRAVITATIONAL FORCE VARIATION IN MEASURING THE MELT FLOW INDEX OF A POLYMER

BACKGROUND

A plastometer is an instrument for making measurements of flow properties of a polymer. For example, a plastometer may be used to measure the Melt Flow Index (MFI), also known as the Melt Flow Rate (MFR), of a polymer, which is defined as the mass of a polymer subjected to a prescribed temperature which flows in ten minutes through a capillary of a specific diameter and length due to pressure applied via prescribed gravimetric weights. In the United States, ASTM D1238 defines various characteristics of a plastometer and the procedure which is performed to determine the Melt Flow Index of a polymer.

FIG. 1 depicts a representative plastometer. A load 105, having a predetermined mass, acts on a piston 110 having a diameter of 9.4742 mm. The polymer for which MFI is to be measured is driven by the piston, which proceeds through a barrel of diameter 9.5504 mm. The polymer is driven through a capillary having a diameter of 2.095 mm and a length of 8.000 mm. Scale 135 measures the mass of the extrudate which is driven through the capillary. The polymer is heated to a specific predefined temperature by temperature control element 130, and this temperature is monitored using temperature sensor 125.

The MFI of a polymer may indicate its strength, tendency to degrade under temperature, and/or suitability for certain manufacturing processes. Engineers commonly seek polymers with an MFI within a specific range, such as a high enough MFI value that the polymer can easily be formed into a particular article, and a low enough MFI value that the article will be mechanically strong enough for its intended use.

DESCRIPTION

The Assignee has appreciated that the plastometer and standards such as ASTM D1238 were developed primarily in industrialized nations which reside in areas of the earth that experience roughly the same gravitational force. As a result, the variability of gravitational force was not a significant concern in developing the apparatus or procedure. The Assignee has also appreciated, however, that manufacturing facilities and other testing facilities are increasingly being located in areas close to the earth's equator, where labor costs are less than in industrialized nations, such as in countries like Malaysia, Indonesia and India. The Assignee has further appreciated that gravitational forces in these areas are different than in many industrialized nations, given that latitude and other factors may cause gravitational force to vary, and that this difference may cause variation in MFI measurements for a given polymer.

In this respect, "standard gravity" is generally accepted to be equal to 9.80665 m/s². However, at latitudes near the equator, the force of gravity may be up to 0.3% lower. The Assignee has appreciated that this difference has a direct effect on the force applied by the load of a plastometer in measuring the MFI of a polymer, and that as a result, the MFI measured for a given polymer in one geographic location may be significantly different than the MFI measured for the same polymer in another geographic location.

Figure 1:
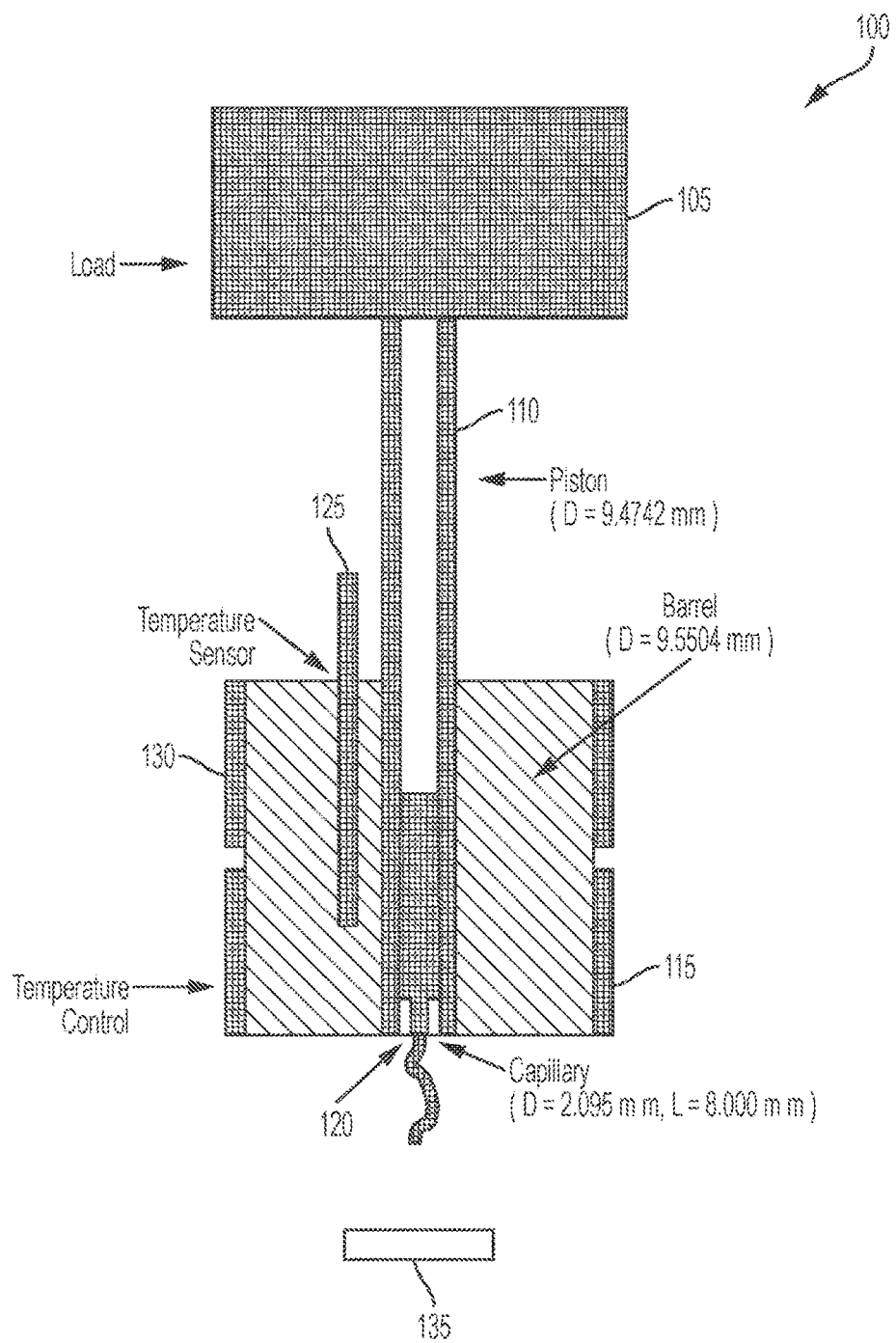
FIG. 1 depicts a plastometer, in accordance with the prior art.

Although the terms "mass" and "weight" are often used interchangeably, weight is a force, while mass is the physical property that, along with gravity, determines the magnitude of this force. That is, the weight of a load at a location is equal to its mass multiplied by the gravitational force at the location. ASTM D1238 specifies, among other things, that the mass of a load and piston combination (e.g., load 105 and piston 110 shown in FIG. 1) is to be 2.16 kg. The weights comprising a load are commonly trimmed to achieve the precise mass specified for the procedure.

The pressure P applied by the load/piston combination is defined as the force per unit area. That is, $$P=F/A, \quad (1)$$

where F is the weight of the load/piston combination, equal to its mass m multiplied by the gravitational force g (i.e., F=mg), and A is the area within the barrel of the plastometer. As a result, $$P=mg/A, \quad (2)$$

where m equals (e.g., is established to be) $w/g_{standard}$. Thus, the pressure applied by the load/piston combination at a specific location is given by $$P=((w/g_{standard})*g/A, \text{ or } P=(g/g_{standard})*w/A, \quad (3)$$

where $g_{standard}$ is standard gravity, and g is the gravitational force at the location.

It should be appreciated that fluids such as molten polymer are presumed to be Newtonian over the relatively small changes in shear stress that would result from varying gravitational force, meaning that the driving forces are proportional to the rates of change of the fluid's velocity vector.

In some embodiments of the invention, the gravitational force g at a specific location may be estimated based at least in part upon the location's latitude. For example, the gravitational force g at a specific latitude φ may be estimated using the following equation:

$$g\{\phi\}=9.780327 \text{ m/s}^2(1+0.00532024 \sin^2\phi - 0.0000058 \sin^2 2\phi) \quad (4)$$

Of course, it should be appreciated that gravitational force may be affected by factors other than latitude. In this respect, the Assignee has appreciated that gravitational force may be affected by a location's altitude or depth, local topography and geology, and/or other factors. For example, the extent to which altitude may affect gravitational force is given by $g\{h\}=-3.086*10^{-6}$ h, where h is the height above sea level. Some embodiments of the invention, then, may employ any or all of these other factors, instead of or in addition to that which is given by formula (4) above, in estimating the gravitational force g at a specific location.

The estimated gravitational force g at a location may be used to correct for any gravitational force variation in measuring the MFI of a polymer at the location—i.e., to determine the MFI for the polymer at standard gravity. In this respect, the presumption that the polymer is Newtonian means that any correction for gravitational force variation at the location may be directly incorporated into the formula for MFI, which is given as $$MFI = 600 \, M/T, \quad (5)$$

where M is the mass in grams of material collected over time T in seconds. Thus, incorporating a correction for gravitational force variation means that MFI at standard gravity for an MFI measurement taken at a location is given by $$MFI = (g_{standard}/g) * 600 \, M/T, \quad (6)$$

where M is the mass in grams of material collected over time T in seconds, $g_{standard}$ is standard gravity, and g is the estimated gravitational force at the location. It can be seen, then, that $g_{standard}/g$ represents an extent to which the gravitational force at a particular location varies from standard gravity.

It should be appreciated from the foregoing that, if one were to erroneously assume that standard gravity acted upon the load/piston combination of a plastometer at a location where gravitational force varies significantly from standard gravity, the MFI measured for a polymer at the location would be significantly different than if the MFI for the polymer were measured at a different location where gravitational force approximates standard gravity. To illustrate, if the procedure defined by ASTM D1238 were performed at a location where gravitational force approximates standard gravity, and 1.000 gram of a polymer were extruded in ten minutes, the MFI for the polymer would be measured as 1.000 g/10 min. However, if the same procedure were performed on the same polymer at a location near the equator, the MFI for the polymer may be measured as low as 0.997 g/10 min.

A difference of this magnitude in such a precise measurement as MFI may have significant consequences. As one example, because manufacturing equipment and/or processes are commonly designed for materials having an MFI within a specific range, such a significant variation from an expected MFI value for a material may lead one to erroneously conclude that the equipment and/or processes may need to be modified to suit the material, at potentially significant cost. As another example, an entity may wish to verify that a polymer purchased from a new supplier was produced according to predefined specifications, and a significant variation from an expected MFI value for the polymer may lead the entity to erroneously conclude that the specifications were not followed.

Figure 2:
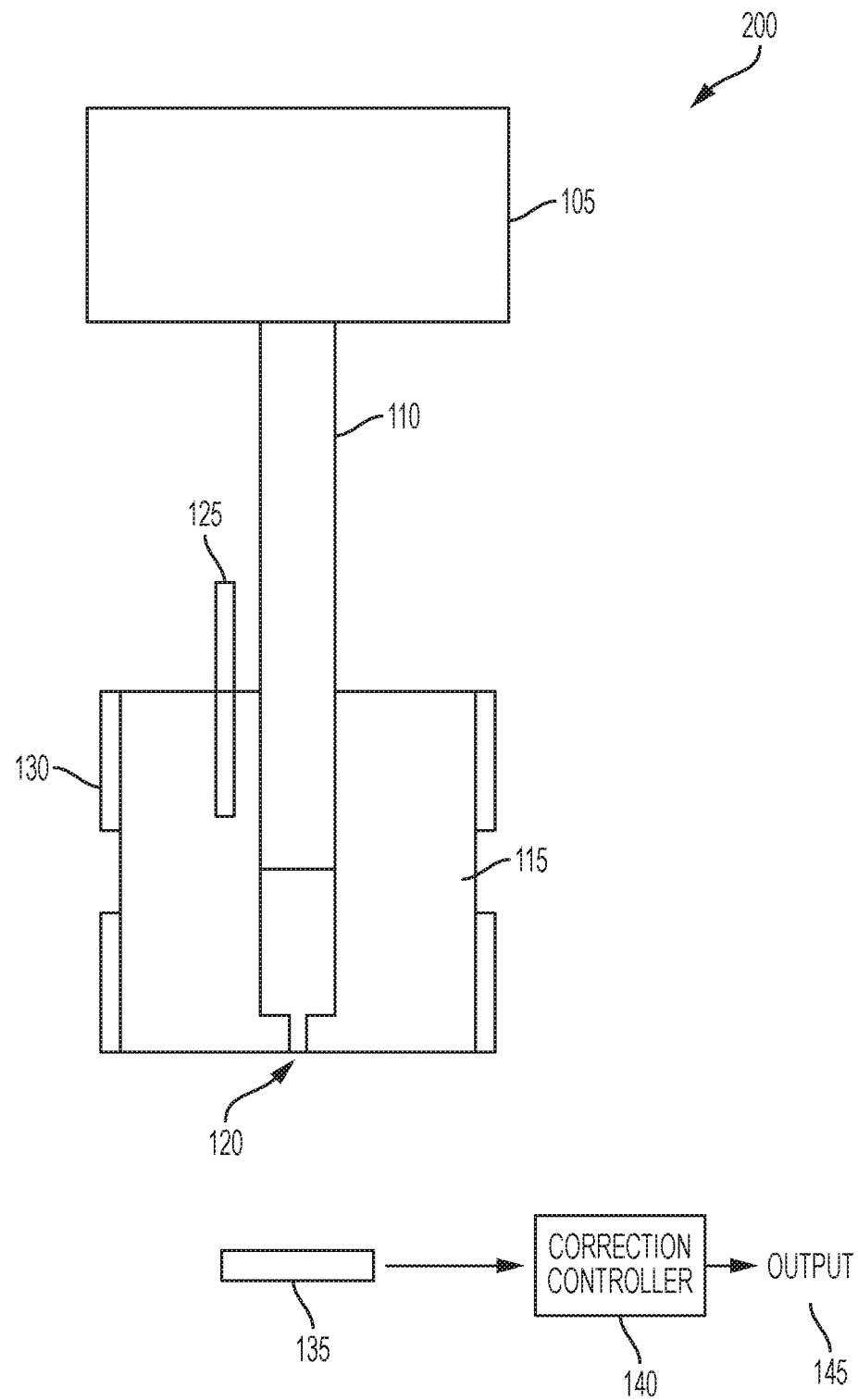
FIG. 2 is a representative plastometer having components adapted to correct for varying gravitational force in measuring the MFI of a polymer, in accordance with some embodiments of the invention.

FIG. 2 depicts a representative apparatus 200 configured to correct for variation in gravitational force in performing MFI measurements, in accordance with some embodiments of the invention. Apparatus 200 is similar in many respects to apparatus 100 (FIG. 1), except that a reading produced by scale 135 is provided as input to correction controller 140, which produces output 145 comprising an MFI value which corrects for variations in gravitational force due to the location at which the MFI measurement is performed. This output may be generated in any of numerous ways. For example, correction controller 140 may calculate the estimated gravitational force g at the location using formula (4) given above, or g may have previously been calculated based on a known location at which apparatus 200 is to perform MFI measurements. Correction controller 140 may then employ g in calculating MFI using formula (6) above, and/or using any other suitable mathematical technique(s).

Output 145 may then be displayed to a user of apparatus 200, such as via a graphical user interface or other form of display.

It should be appreciated that correction controller 140 may comprise any suitable component or collection of components to perform the function described above, and/or other functions not described above. Correction controller 140 may be implemented using hardware, software or a combination thereof. When implemented in software, software code may be executed on any suitable processor or collection of processors, whether provided in a single computer or distributed among multiple computers. Correction controller 140 may be implemented in any of numerous ways, such as with dedicated hardware, or with general purpose hardware (e.g., one or more processors) that is programmed using microcode or software to perform the functions described above, and/or other functions. A detailed description of a representative computing device which may be used to implement correction controller 140 is provided below with reference to FIG. 4.

It should also be appreciated that the invention is not limited to using mathematical techniques like those described above to correct for variations in gravitational force, as any of numerous approaches may be followed. For example, some embodiments of the invention may involve adjusting or calibrating scale 135 to account for gravitational force variation, using manual procedures, automated procedures, or a combination thereof. Some embodiments of the invention may add or remove material from load 105 to account for variations in gravitational force. Any of numerous techniques may be used to account for gravitational force variations in measuring the MFI of a polymer, and the invention is not limited to being implemented in any particular way.

Figure 3:
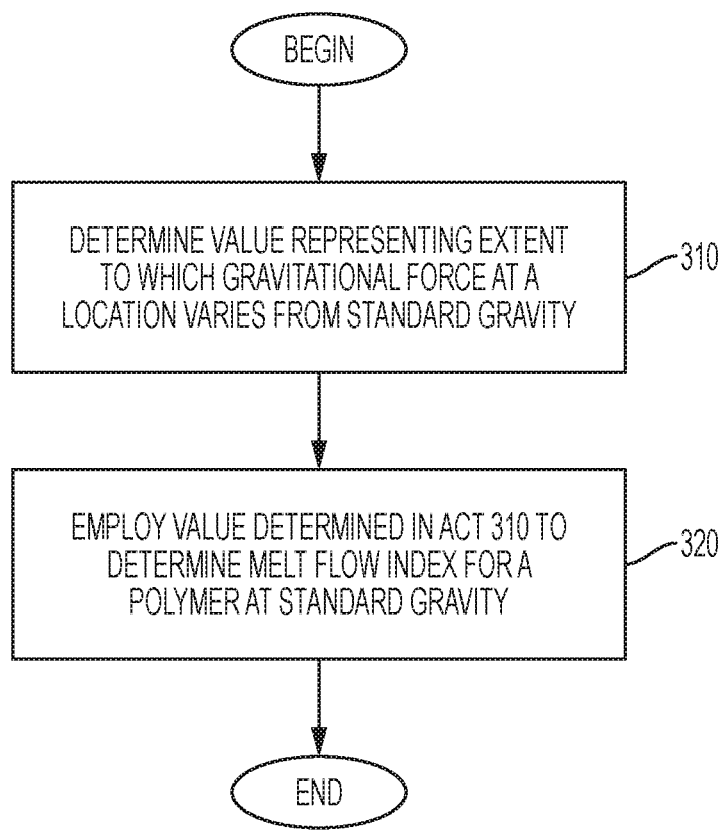
FIG. 3 is a flow chart depicting a representative process for correcting for varying gravitational force in measuring the MFI of a polymer, in accordance with some embodiments of the invention.

FIG. 3 depicts a representative process 300 for correcting for the gravitational force variations at a location in measuring the MFI for a polymer. Representative process 300 begins at act 310, wherein a value is determined which represents an extent to which gravitational force at the location varies from standard gravity. For example, as noted above, $g_{standard}/g$ may represent an extent to which gravitational force at the location varies from standard gravity, and may be calculated using a value for g which is determined according to formula (4) above. It should be appreciated, however, that any suitable value representing an extent to which gravitational force at a location varies from standard gravity may be used, and that this value may be determined in any suitable way.

Representative process 300 then proceeds to act 320, wherein the value determined in the act 310 is employed in determining the MFI for a polymer at standard gravity. This may be performed in any of numerous ways. As one example, the value determined in the act 310 may be used in calculating an MFI value (e.g., via execution of programmed instructions, such as by controller 140 (FIG. 2)) at standard gravity using formula (6) above. As another example, the value determined in the act 310 may be used to determine a modification to the mass of the load and/or piston of a plastometer (e.g., load 105 and/or piston 110 shown in FIG. 1) to account for gravitational force variation. As yet another example, the value determined in the act 310 may be used to adjust a scale used for measuring the mass of extrudate so as to account for gravitational force variation. Any suitable technique may be used to apply the result of the determination in act 310 in determining the MFI for a polymer at standard gravity. Representative process 300 then completes. It should be appreciated that although the foregoing description references only ASTM D1238 as a standard defining the characteristics of a plastometer and the procedure performed to determine the Melt Flow Index of a polymer, the invention is not limited to being employed in relation to the procedure defined by ASTM D1238, or a plastometer having the characteristics specified by ASTM D1238. For example, some embodiments of the invention may be used in relation to a plastometer and/or procedure specified by ISO 1133, any of various non-U.S. country-based standards, one or more other standards, or a combination thereof.

Figure 4:
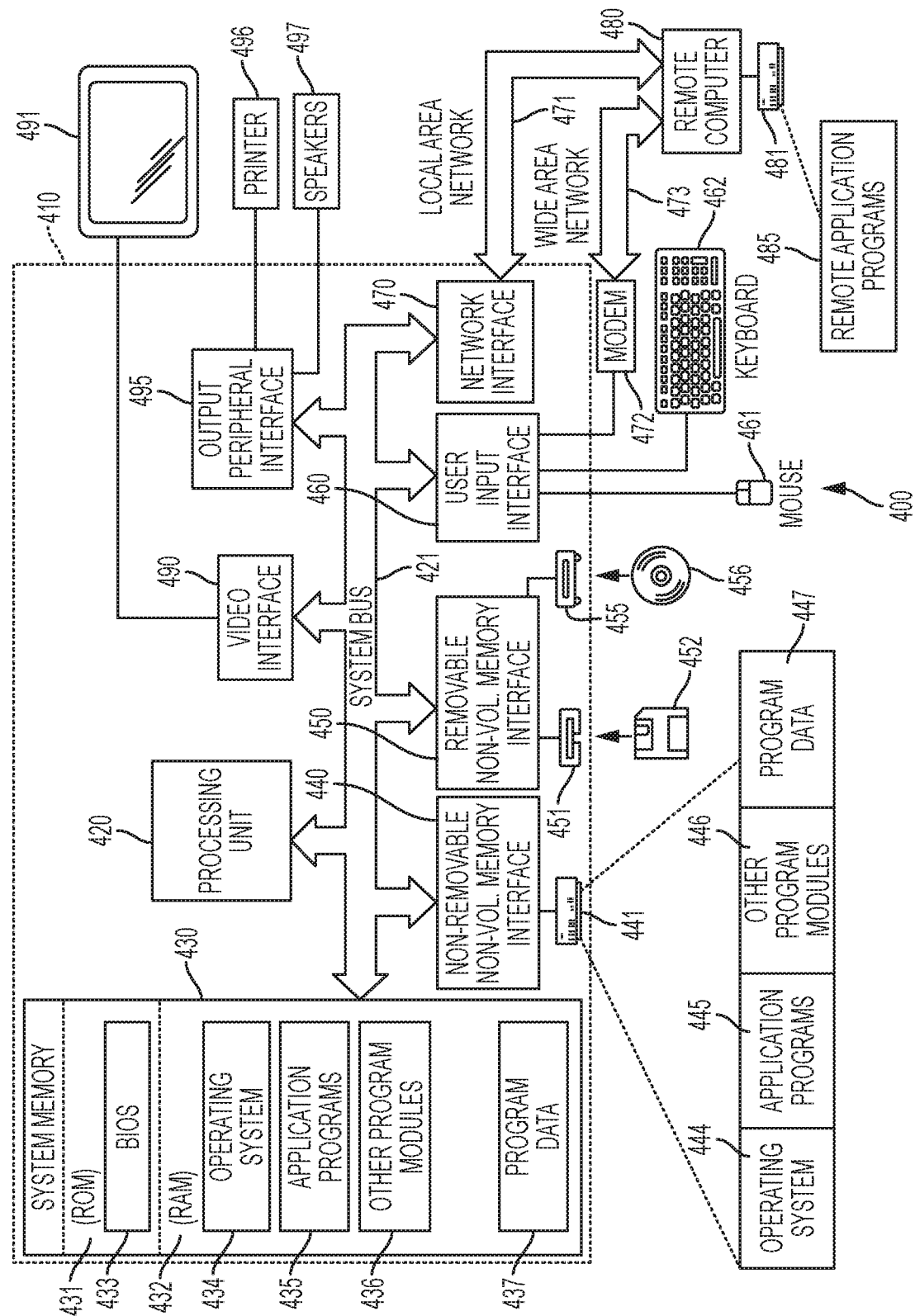
FIG. 4 is a representative computer system which may be used to implement aspects of the invention.

As noted above, some aspects of the invention may be implemented using a computing device. For example, correction controller 140 may be implemented, wholly or in part, using a computing device, and a computing device may be used in performing representative process 300. FIG. 4 depicts a general purpose computing device, in the form of a computer 410, which may be used to implement certain aspects of the invention. For example, computer 410 or components thereof may constitute any of the audio controllers, mobile devices, and/or networking components described above.

In computer 410, components include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other one or more media which may be used to store the desired information and may be accessed by computer 410. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 439, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 459 such as a CD ROM or other optical media. Other removable/non-removable, volatile/nonvolatile computer storage media that can be used in the exemplary computing system include, but are not limited to, magnetic tape cassettes, flash memory cards, digital versatile disks, digital video tape, solid state RAM, solid state ROM, and the like. The hard disk drive 441 is typically connected to the system bus 421 through an non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 449, and program data 447. Note that these components can either be the same as or different from operating system 434, application programs 435, other program modules 439, and program data 437. Operating system 444, application programs 445, other program modules 449, and program data 447 are given different numbers here to illustrate that, at a minimum, they are different copies. A user may enter commands and information into the computer 410 through input devices such as a keyboard 492 and pointing device 491, commonly referred to as a mouse, trackball or touch pad (e.g., a capacitive or resistive touch screen). Other input devices (not shown) may include a microphone, joystick, game pad, satellite dish, scanner, or the like. These and other input devices are often connected to the processing unit 420 through a user input interface 490 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 499, which may be connected through a output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 490, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Embodiments of the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a tangible machine, mechanism or device from which a computer may read information. Alternatively or additionally, the invention may be embodied as a computer readable medium other than a computer-readable storage medium. Examples of computer readable media which are not computer readable storage media include transitory media, like propagating signals.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those which are described, and/or which may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An apparatus, comprising:
   instrumentation, adapted to measure a melt flow index for a polymer, at a location; and
   a controller, configured to determine a melt flow index for the polymer at standard gravity, wherein the melt flow index for the polymer at standard gravity is determined based at least in part upon the melt flow index measured at the location using the instrumentation, and a value representing an extent to which gravitational force at the location varies from standard gravity.

2. The apparatus of claim 1, wherein the value representing the extent to which gravitational force at the location varies from standard gravity is determined based at least in part on the latitude of the location.

3. The apparatus of claim 2, wherein the value representing the extent to which gravitational force at the location varies from standard gravity is calculated as $g_{standard}/g$, where $g_{standard}$ is standard gravity equal to 9.80665 m/s$^2$, and g represents gravitational force at latitude $\phi$ and is given by $g\{\phi\}=9.780327$ m/s$^2$(1+0.00532024 sin$^2\phi$−0.0000058 sin$^2 2\phi$).

4. The apparatus of claim 1, wherein the instrumentation comprises a plastometer.

5. The apparatus of claim 4, wherein the plastometer is adapted to measure the melt flow index for the polymer in accordance with ASTM D1238.

6. The apparatus of claim 1, wherein the controller is implemented at least in part via software.

7. A method, comprising acts of:
   (A) determining, for a location, a value representing an extent to which gravitational force at the location varies from standard gravity;
   (B) employing the value determined in the act (A) to determine a melt flow index for a polymer at standard gravity.

8. The method of claim 7, wherein the act (A) comprises determining a value representing the extent to which gravitational force at the location varies from standard gravity based at least in part upon the latitude of the location.

9. The method of claim 8, wherein the act (A) comprises determining the value representing the extent to which gravitational force at the location varies from standard gravity by calculating $g_{standard}/g$, where $g_{standard}$ is standard gravity equal to 9.80665 m/s$^2$, and g represents gravitational force at latitude $\phi$ and is given by $g\{\phi\}=9.780327$ m/s$^2$(1+ 0.00532024 $\sin^2\phi-0.0000058 \sin^2 2\phi$).

10. The method of claim 7, wherein the act (B) comprises determining a melt flow index for the polymer at the location using a plastometer.

11. The method of claim 10, wherein the plastometer is adapted to measure the melt flow index for the polymer in accordance with ASTM D1238.

12. The method of claim 7, wherein the act (B) comprises executing programmed instructions to determine the melt flow index for the polymer at standard gravity.

13. The method of claim 7, wherein the melt flow index for the polymer is determined using a plastometer comprising a load and piston, and wherein the act (B) comprises employing the value determined in the act (A) in modifying a mass of one or more of the load and piston.

14. The method of claim 7, wherein the melt flow index for the polymer is determined using a plastometer comprising a scale for measuring a mass of extrudate, and wherein the act (B) comprises employing the value determined in the act (A) in adjusting the scale.

15. At least one computer-readable storage medium having instructions encoded thereon which, when executed by a computing system, cause the computing system to perform a method comprising acts of:

(A) determining, for a location, a value representing an extent to which gravitational force at the location varies from standard gravity;

(B) employing the value determined in the act (A) to determine a melt flow index for a polymer at standard gravity.

16. The at least one computer-readable storage medium of claim 15, wherein the act (A) comprises determining a value representing the extent to which gravitational force at the location varies from standard gravity based at least in part on the latitude of the location.

17. The at least one computer-readable storage medium of claim 16, wherein the act (A) comprises determining the value representing the extent to which gravitational force at the location varies from standard gravity by calculating $g_{standard}/g$, where $g_{standard}$ is standard gravity equal to 9.80665 m/s$^2$, and g represents gravitational force at latitude $\phi$ and is given by g $g\{\phi\}=9.780327$ m/s$^2$(1+0.00532024 $\sin^2\phi-0.0000058 \sin^2 2\phi$).

18. The at least one computer-readable storage medium of claim 15, wherein the act (B) comprises determining a melt flow index for the polymer at the location using a plastometer.

19. The at least one computer-readable storage medium of claim 18, wherein the plastometer is adapted to measure the melt flow index for the polymer in accordance with ASTM D1238.

* * * * *